United States Patent [19]
DiSaverio et al.

[11] Patent Number: 6,151,776
[45] Date of Patent: Nov. 28, 2000

[54] METHOD FOR INSTALLATION OF DEVICES HAVING DIFFERENT HEIGHTS

[75] Inventors: Charles Thomas DiSaverio, Apalachin; James Robert Malia, Owego, both of N.Y.

[73] Assignee: Lockheed Martin Corp., Owego, N.Y.

[21] Appl. No.: 09/197,628

[22] Filed: Nov. 23, 1998

[51] Int. Cl.$^7$ .................................................. H01R 43/00
[52] U.S. Cl. .............................. 29/868; 29/857; 29/858; 29/859; 29/860; 29/861; 29/862; 29/863; 29/864; 29/865; 29/866; 29/867; 29/868; 174/60; 174/135; 439/371; 439/451; 439/439
[58] Field of Search ..................... 29/859–868; 174/60, 174/135; 439/371, 451, 439

[56] References Cited

U.S. PATENT DOCUMENTS

| | | | |
|---|---|---|---|
| 3,637,076 | 1/1972 | Halopoff | 209/124 |
| 4,461,661 | 7/1984 | Fabel | 156/70 |
| 4,900,941 | 2/1990 | Barton | 250/566 |
| 5,072,401 | 12/1991 | Sansone | 364/478 |
| 5,252,353 | 10/1993 | DjGiulio | 427/8 |
| 5,692,029 | 11/1997 | Husseiny | 378/88 |
| 6,006,210 | 12/1999 | Freeman | 705/402 |

*Primary Examiner*—Lee Young
*Assistant Examiner*—Paul D. Kim
*Attorney, Agent, or Firm*—W. H. Meise; R. P. Cogan

[57] ABSTRACT

An installation method for installing machines of different heights at an installation site includes provision of a flexible power cord of particular length, affixed to an upper region of each machine. The power cord is terminated in a power-rated male connector. At the intended installation location, the power cord origination location is identified, which is the location at which the power cord will originate after installation. An interface box having a NEMA female connector is installed at a location such that the female connector is at a radius from the power cord origination location which is less than the length of the flexible power cord. The interface box is installed, connected to a power source, and tested, before physical installation of the machine. At the time of physical installation of the machine, there is no delay attributable to hard-wiring of the power connections to the machine, and it is connected with the flexible power cord.

2 Claims, 6 Drawing Sheets

METHOD FOR INSTALLATION OF DEVICES HAVING DIFFERENT HEIGHTS

FIELD OF THE INVENTION

This invention relates to installation of machines or devices such as postal handling devices, and more particularly to installation of electrical connections to such devices which have various heights.

BACKGROUND OF THE INVENTION

Many postal handling machines or devices are large, and require "permanent" installation in a large building or site. Among the machines which require such installations are those called a "tower," illustrated in simplified form in FIG. 1. In FIG. 1, a tower assembly is designated generally as 10, and as illustrated is located in the corner of a room having a floor 12 and ceiling 14. The tower assembly 10 includes a tower structure proper, which is designated generally as 11, and which includes a vertical structure portion 16. Vertical structure portion 16 is illustrated as being solid, but it may actually be in the form of an open support structure such as an array of columns and transverse members. Tower assembly 10 includes an upper conveyor device illustrated as a roller conveyor 18 which extends from a remote location (not illustrated, but to the left of the illustration of FIG. 1) past the upper end of the tower structure 16. Tower assembly 10 further includes a lower conveyor device illustrated as a roller conveyor 20, which extends past a lower portion of the tower structure 16, and extends to the right in the illustration to a remote location (not illustrated). The conveyor devices 18 and 20 are dimensioned to move or carry trays or pans, one of which is illustrated as 22, to and from the tower 11.

In operation of the tower apparatus 10 of FIG. 1, trays such as 22 are conveyed by upper conveyor 18 from left to right, sequentially bringing trays, to a location adjacent the tower structure 16. When a tray being carried on upper conveyor 18 comes alongside an aperture 24 in the upper end of tower structure 16, it is, or may be, transferred from the conveyor 18 into the tower structure 16 by an "OP pusher" (not illustrated). The tower structure 16 moves the trays from the upper aperture 24 to a lower aperture 26, from which the trays are transferred onto roller conveyor 20 by additional pushing arrangements (not illustrated). Lower roller conveyor 20 carries the trays from lower aperture 26 to another mail-handling device (not illustrated) for further operations. In some installations, all of the trays carried by upper conveyor 18 may be moved into tower structure 16, and upper conveyor 18 may in that mode of operation be terminated at location 18T, while in other installations or modes of operation, only some of the trays being conveyed by roller conveyor 18 are transferred to the tower structure 16, and those trays remaining on roller conveyor 18 continue on, on an extension of roller conveyor 18 (not illustrated), to other such tower structures (not illustrated). Vertical movement of the trays within tower structure 16 is accomplished by a series or train of movable tray supports or shelves (not illustrated).

The function of the tower structure 10 of FIG. 1, taken as a whole, is to buffer the flow of trays entering the mail-handling and mail-sorting system (not illustrated) in a manner which smoothes the arrival of trays at the other mail-handling machines in the overall mail-handling and mail-sorting system. The amount of buffering available depends upon the number of trays 22 which can be stored in a vertical array within the tower structure 16. Since the loaded trays have more-or-less uniform vertical dimensions, the maximum possible amount of buffering available from a particular tower depends upon its vertical height. In a particular mail-handling and -sorting installation, there may be many such towers, which provide buffering to various portions of the system.

In any mail-handling and -sorting installation, the maximum amount of buffering available from any one tower cannot exceed the amount of buffering provided by a tower of a height which will fit between the floor and the ceiling of the site. In many installations, the building is more akin to a factory, in that the ceiling is not a smooth finished surface, but includes roof rafters or trusses, pipes, conduits, and the like. In some situations, the design of the mail-handling and -sorting installation may require less buffering at some locations in the system than at other locations, so the heights of the various towers may differ from one another. It will be appreciated that mail-handling and -sorting equipment is highly automated, and that overall operation of the mail-handling and -sorting system is controlled by computer systems, which coordinate the operations of the various devices. These computer systems communicate among each other (if appropriate) and with the various mail-handling and -sorting machines by way of a local area network (LAN).

When mail-handling and -sorting equipment is ordered from the manufacturer, the mail-handling and -sorting system has already been designed, the locations of the various equipments are known, and the requisite height of the tower is also known. Thus, the height of the tower is specified to the manufacturer, and the tower, when it arrives at the site, and moved to the predetermined location, is then ready for installation. As delivered, the mail-handling equipment is provided with one or more junction boxes to which alternating-current (AC) power must be coupled from the site's main power source, and the equipment is also provided with one or more connectors to which connections can be made to a control system, which as mentioned may be a local area network (LAN).

After the tower is placed at the proper location and uncrated, if necessary, the installation proceeds. In addition to making the mechanical connections of the various conveyors to the tower being installed, the tower must be electrically powered. In order to provide electrical power, an electrician runs conduit between the nearest appropriate source of AC power and the tower. In this context, the term "appropriate" may mean a source of power which is independently controlled by a circuit breaker or switch. Thus, the conduit run may be of substantial length, in order to reach from the tower installation site to a switch or breaker box. FIG. 2 is a simplified illustration of a tower support structure 16 located at its installation site. As illustrated, the upper end 16u of the tower structure 16 is below the lower edges of roof trusses or beams, some of which are illustrated as 30. Since the floor 12 of the installation must be kept clear for personnel, the conduit 32 is ordinarily routed along the ceiling of the building, and in those installations in which beams or trusses are exposed, conventional conduit hangers, one of which is illustrated as 34, can be used to support the conduit in proper position. The conduit makes a bend 38 adjacent the upper end 16u of the tower structure 16, is connected to the tower structure 16 at various locations along its length, as illustrated by support 40, and terminates at a connection or junction box 42 provided by the manufacturer of the tower.

The tower manufacturer provides, as part of the tower structure, all the internal electrical connections between the junction box 42 and the internal machinery of the tower. The control or LAN wiring may be handled in a different manner, but the connections must nevertheless be provided and made in a reliable manner.

After the conduit 32 of FIG. 2 is run, insulated wires are pulled through the conduit and into the junction boxes at each end of the conduit (only the box 42 at the tower end of the conduit is illustrated), and connections are made between the stripped ends of each of the wires running through the conduit and the lugs or other connectors provided in the junction box 42 on the tower and the junction box (not illustrated) at the power source. The electrical power source is ordinarily three-phase, so at least three wires, and often more, are run through the conduit. The insulated wires are illustrated as 36 in FIG. 2.

After the tower 11 is placed at the proper location, the control wiring must be connected. This may be done prior to, after, or concurrently with the installation of the electrical power connections. As mentioned, the control wiring may be handled in a manner different than that for the power wiring. The installation of both the electrical power wiring and the control wiring is then checked to verify correct installation, and the machine may then be energized.

Improved installation methods are desired.

SUMMARY OF THE INVENTION

A method for installing mail-handling towers of various heights at a mail-handling site includes, prior to physical installation of any one of the towers at its intended tower location within the site, the step of selecting a location at which an interface box can be installed, including the step of determining a support location which is within a particular radius from a particular location near the upper end of the particular one of the towers, having a particular height, to be installed at the tower location within the site. An interface box is procured, which includes at least two power terminals associated with a NEMA configuration female connector having a particular pin configuration, and which also includes at least two power terminals which are not in a NEMA configuration connector. The interface box which is procured further has electrical interconnections between at least two of the NEMA pins and corresponding ones of the non-NEMA terminals. At a time no later than the time of physical installation of the particular one of the towers at the tower location within the site, the interface box is physically installed at the support location. No later than the time of physical installation of the particular one of the towers at the tower location within the site, conventional electrical connections are made between a source of electrical power and the non-NEMA power terminals of the interface box. No later than concurrently with completion of the physical installation of the particular one of the towers at the tower location within the site, the power available at the pins of the NEMA configuration female connector is tested to verify conformance with a standard. One of the towers having the particular height is physically installed at the tower location. The tower which is physically installed has, as delivered, a flexible power cord terminated at a NEMA configuration male connector which has a pin configuration mating with that of the NEMA configuration female connector. The flexible power cord is affixed to the particular location near the upper end of the one of the towers which is physically installed. The power cord has a free end capable of being extended from the particular location near the upper end of the one of the towers being physically installed by an amount which is greater than the radius. A connection is made between the NEMA configuration male and female connectors, preferably leaving a strain-relief loop in the flexible power cord.

In a preferred mode of performing the method, the step of making a connection between the NEMA male and female connectors includes the step of introducing a strain-relief loop into the power cord. Ideally, the step of affixing the flexible power cord to the tower is performed before the time at which the tower is delivered to the site.

DESCRIPTION OF THE INVENTION

Figure 1:
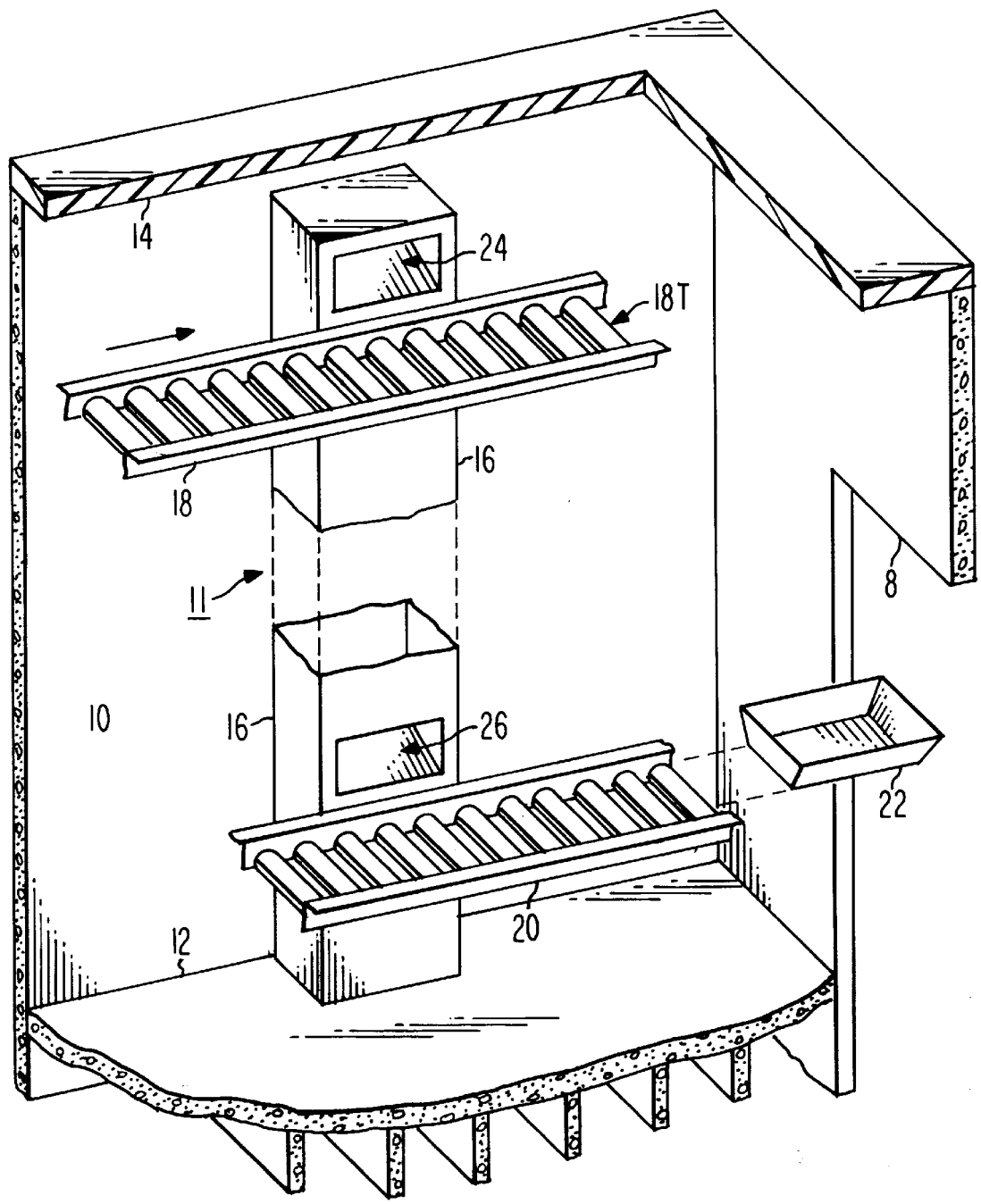
FIG. 1 is a simplified perspective or isometric view of a portion of a prior-art tower located in a portion of a room.
Figure 2:
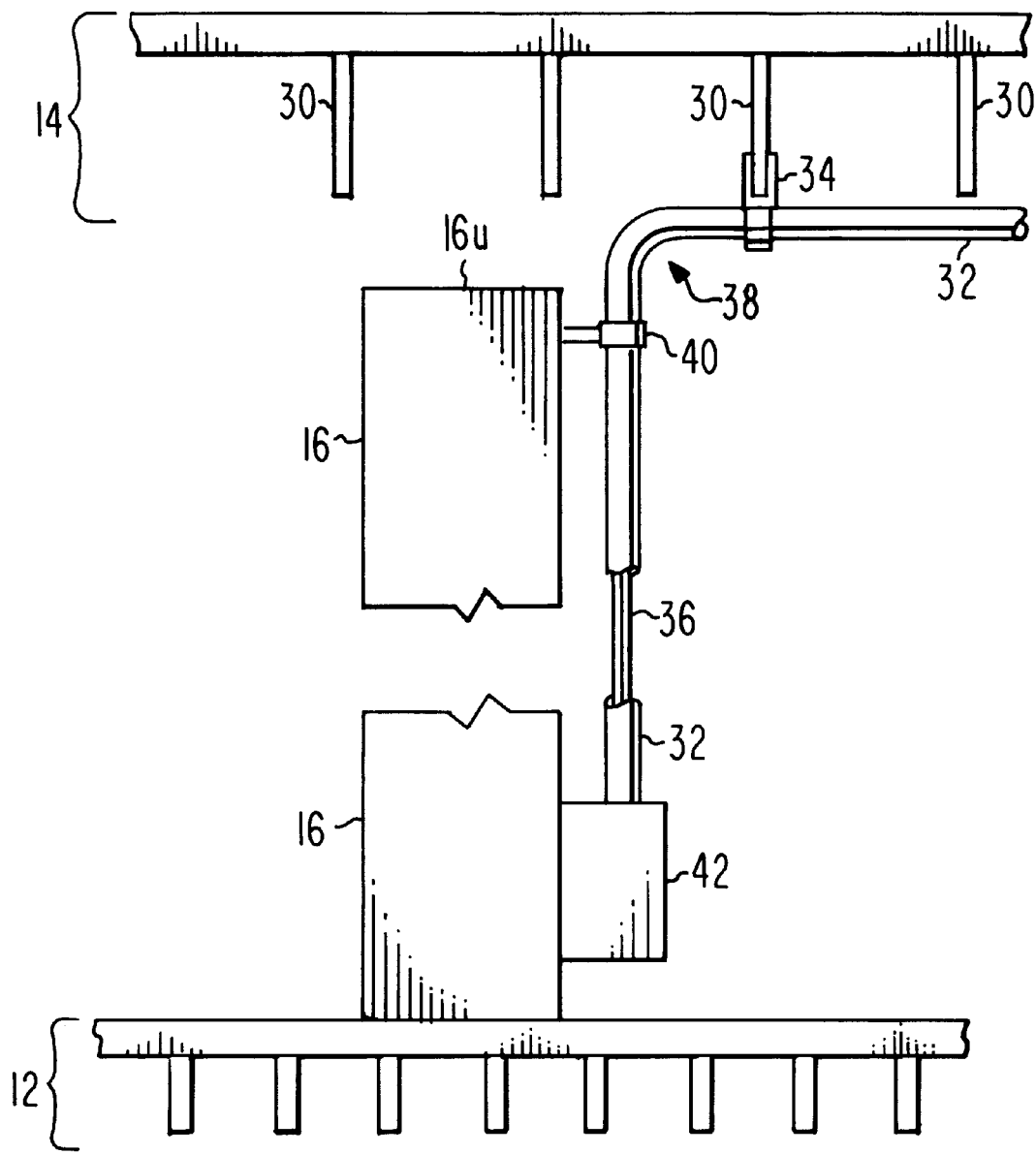
FIG. 2 is a simplified elevation or side view of a portion of the tower assembly of FIG. 1, illustrating a prior-art conduit run.
Figure 3:
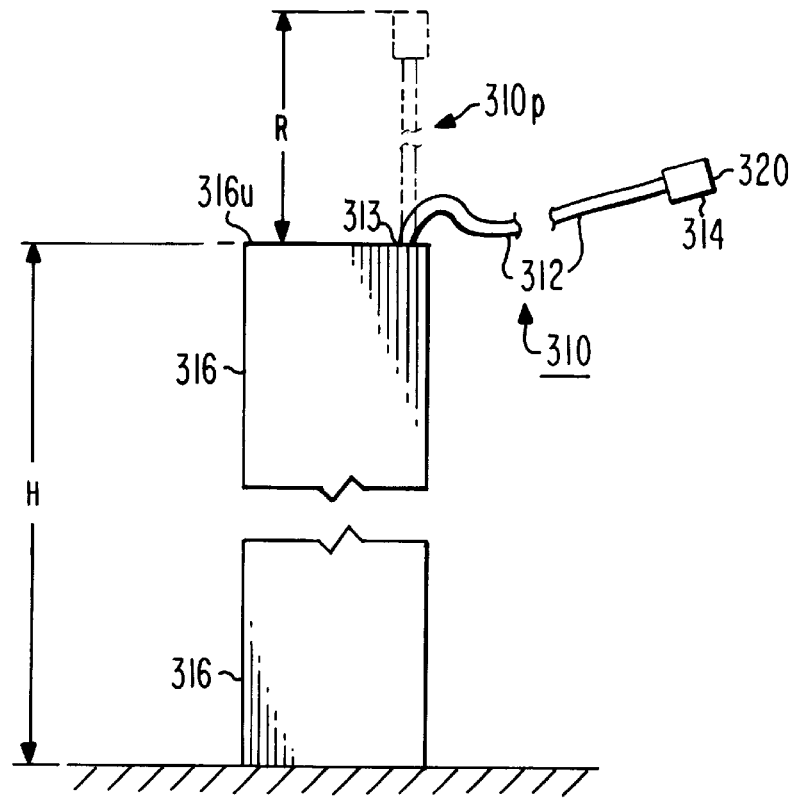
FIG. 3 is a simplified diagram illustrating a tower as manufactured and uncrated at the installation site.

FIG. 3 is a simplified diagram illustrating a tower as manufactured and uncrated at the installation site. In FIG. 3, the tower structure is designated 316 to differentiate it from the prior-art tower structure 16. Tower structure 316 has height H between the support portion (the floor) and the upper extremity 316u. This height is specified by the customer or the mail-handling and sorting system designer who designs the system of which the tower will be a part. Tower structure 316 differs from tower structure 16 in that it does not have a discrete junction box 42 intended for conduit connections. Instead, the arrangement of FIG. 3 has the internal electrical connections to the internal machinery of the tower structure 316 coupled to a flexible power cord designated generally as 310. As illustrated, power cord 310 is coupled out of the structure at a point 313 on the upper extremity or end 316u of the tower structure. Thus, the flexible power cord 310 is physically connected to the upper end or extremity 316u of the tower structure 316. It should be noted that connection at the very end of the tower structure is not mandatory, as it is sufficient if it is near the upper extremity, which for this purpose means above head height, so as to be out of the way.

Flexible power cord 310 of FIG. 3 includes a flexible insulated sheath 312 containing at least two, and in the preferred embodiment four, individually insulated wires or electrical conductors dimensioned to accommodate the expected electrical current.

Flexible power cord 310 is terminated in a National Electrical Manufacturer's Association (NEMA) male electrical connector 314. As known to those skilled in the art, at least those electrical wires within sheath 312 which are intended to be used are electrically connected to "pins" or terminals of the NEMA connector 314.

As also illustrated in FIG. 3, the length of the flexible power cord 310 which lies outside the tower structure 316 is established to provide a length R between point 313 and the remote end 320 of connector 314. The dimension is illustrated in FIG. 3 by the phantom position 310p of the flexible power cord 310. This radius R allows the remote end 320 of the flexible cable 310 to extend vertically (if so positioned) to height R above upper extremity 316u of the tower structure 316.

Figure 4:
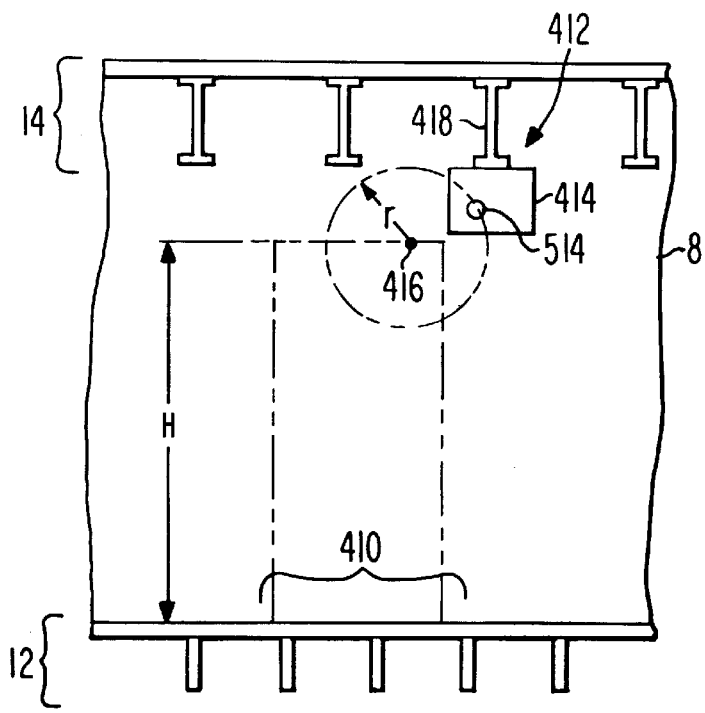
FIG. 4 is a simplified side elevation illustration of the location at which the tower of FIG. 3 is to be installed at the installation site.

FIG. 4 is a simplified illustration of the location at which the tower of FIG. 3 is to be installed at the installation site. In FIG. 4, the ceiling 14 is seen to include a plurality of exposed trusses or beams, one of which is designated as 418. The physical floor location at which the tower of FIG. 3 is to be installed is illustrated as 410. floor is location 410, together with the known height H of the tower, defines a three-dimensional volume (not illustrated) which will be occupied by the tower. The height H and the floor location 410 define a point, illustrated as 416, which corresponds with the location 313 at which the attachment of flexible cable 310 to the tower 316 will be located.

An interface or junction box 414 of FIG. 4 includes an externally accessible NEMA configuration female connector, illustrated as 514. A physical location, illustrated as 412, is selected for physical mounting of interface box 414. The location 412 which is selected for the physical mounting of interface box 414 is determined by establishing dimensions corresponding to a distance or radius of r from point 416, which is the location at which the flexible power cable is mounted to the tower when the tower is installed. The radius r is the distance between point 416 and the NEMA configuration female connector 514. Radius r is selected to be less than radius R so as to provide at least enough slack to allow a strain-relief loop, described below, to be used when connections are made.

As illustrated in FIG. 4, interface box 414 is mounted on, or supported by, the lower edge of a beam 418. The most convenient mounting support should be used for physical mounting of interface box 414, and if no suitable support is found within the desired radius, it may be desirable to provide such a support.

Figure 5:
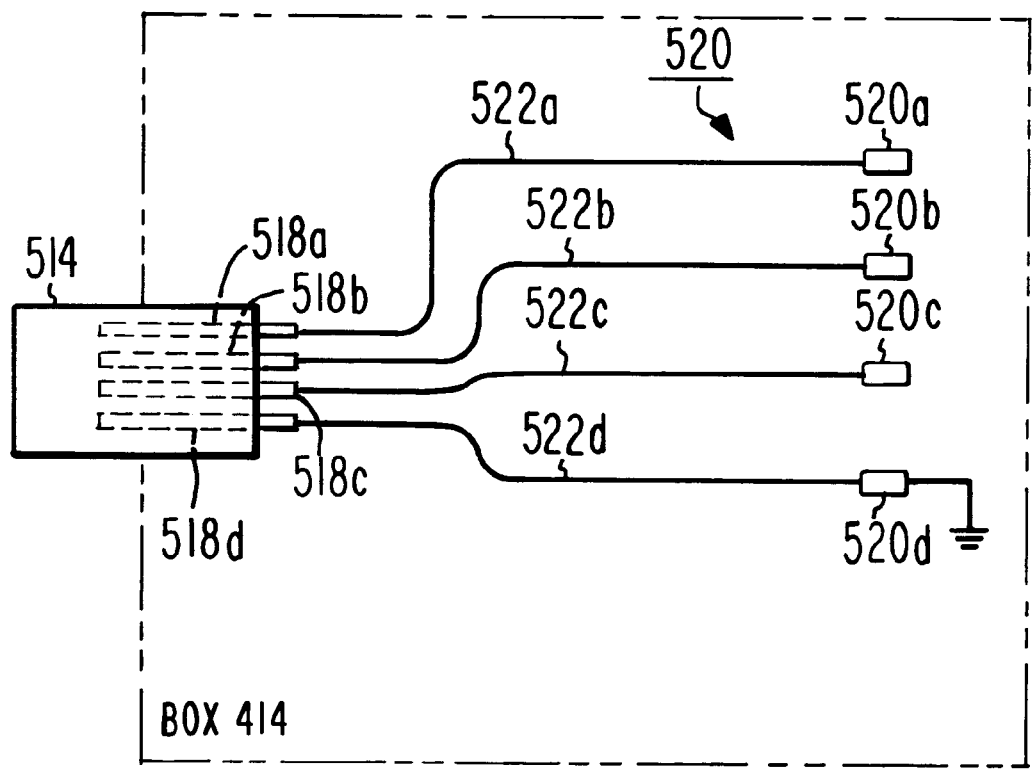
FIG. 5 illustrates a simplified connection diagram for the power portion of interface box of FIG. 4.

FIG. 5 illustrates a simplified connection diagram for the interface box of FIG. 4. In FIG. 4, the NEMA configuration female connector 514 is illustrated in simplified side view, with the individual terminals or "pins" illustrated in phantom. As illustrated, the NEMA connector 514 includes a set 518 of pins, consisting of four individual pins, designated 518a, 518b, 518c, and 518d. Interface box 414 as illustrated also includes four junction terminals of a set 520, namely junction terminals 520a, 520b, 520c, and 520d. While the numbers of terminals in sets 518 and 520 happen to be equal, there is no particular need for the equality.

FIG. 5 also illustrates electrical conductors or "wires" extending between terminals 518a and 520a; 518b and 520b, 518c and 520c; and 518d and 520d. These interconnections or jumpers couple electrical power between the specified pairs of terminals or pins.

Figure 6B:
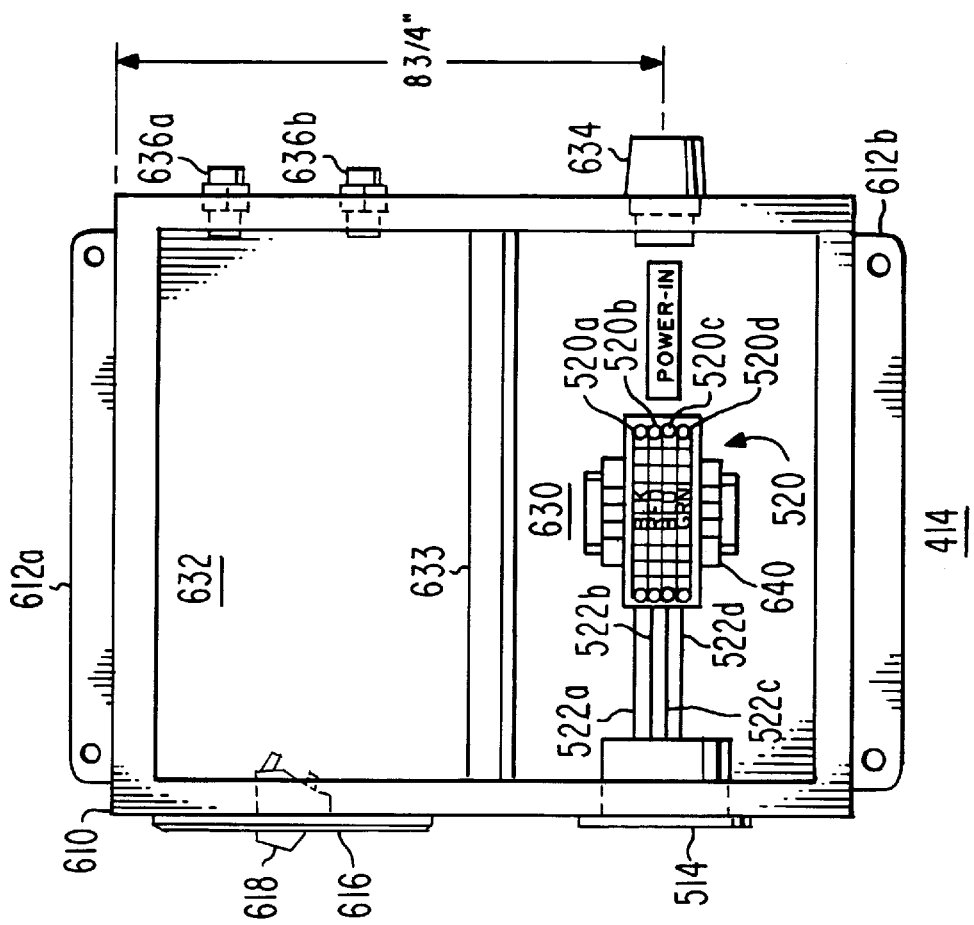
FIG. 6b is a frontal elevation view thereof.
Figure 6A:
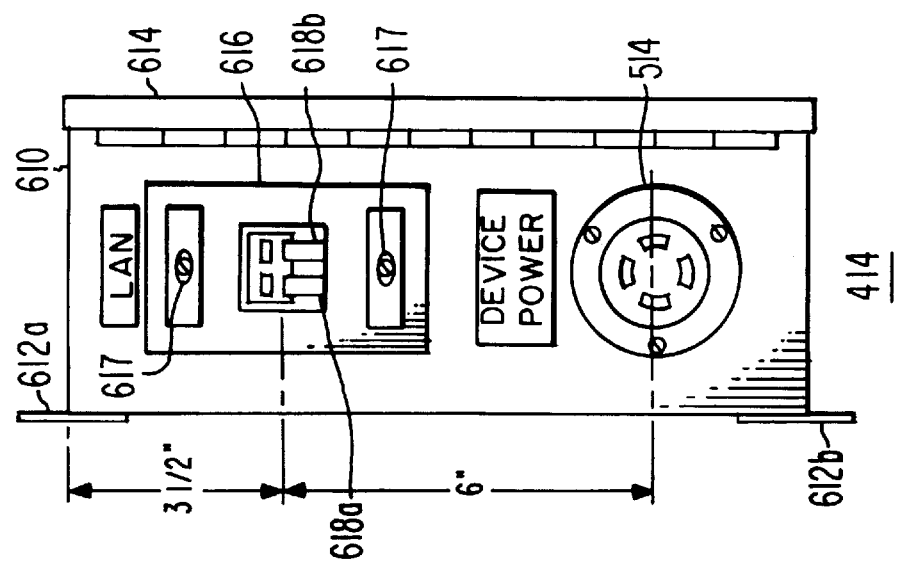
FIG. 6a is an elevation view of a right side of a junction box such as that of FIGS. 4 and 5.

FIG. 6a is an elevation view of a right side of a junction box such as 414 of FIGS. 4 and 5, and FIG. 6b is a frontal elevation view. In FIG. 6a, the body of the interface box 414 is designated as 610, and mounting flanges are designated 612a and 612b. A hinged cover or lid is illustrated as 614. In this particular configuration of interface box, a plate 616, held in place by screws 617, provides a pair of externally accessible connection points 618a, 618b, to which connectors appropriate for control signals may be connected.

In FIG. 6a, the pin pattern or configuration of the particular NEMA female connector 514 can be seen. The pattern is basically a circular pattern of slots, with the bottom-most slot (as illustrated) having a radial portion for keying.

FIG. 6b shows the interior of the interface box 414. In FIG. 6b, that portion of NEMA configuration female connector 514 which lies inside the body 614 of interface box 414 projects into a "power" chamber designated 630, which is divided from a second "signal" chamber 632 by a dividing wall 633. The electrical conductors 522a, 522b, 522c, and 522d associated with NEMA configuration female connector 514 are indicated as being colorcoded black (BLK), red, blue (BLU), and green (GRN), respectively. A terminal block 640 lies within chamber 630, and carries the non-NEMA terminals of set 520. A gland or fitting 634 provides access into chamber 630 for the hardwired power from a conduit or the like. Similarly, fittings 636a and 636b provide passage for two control cables, as might be required, for example, when control for the tower is bridged into a LAN loop.

Figure 7:
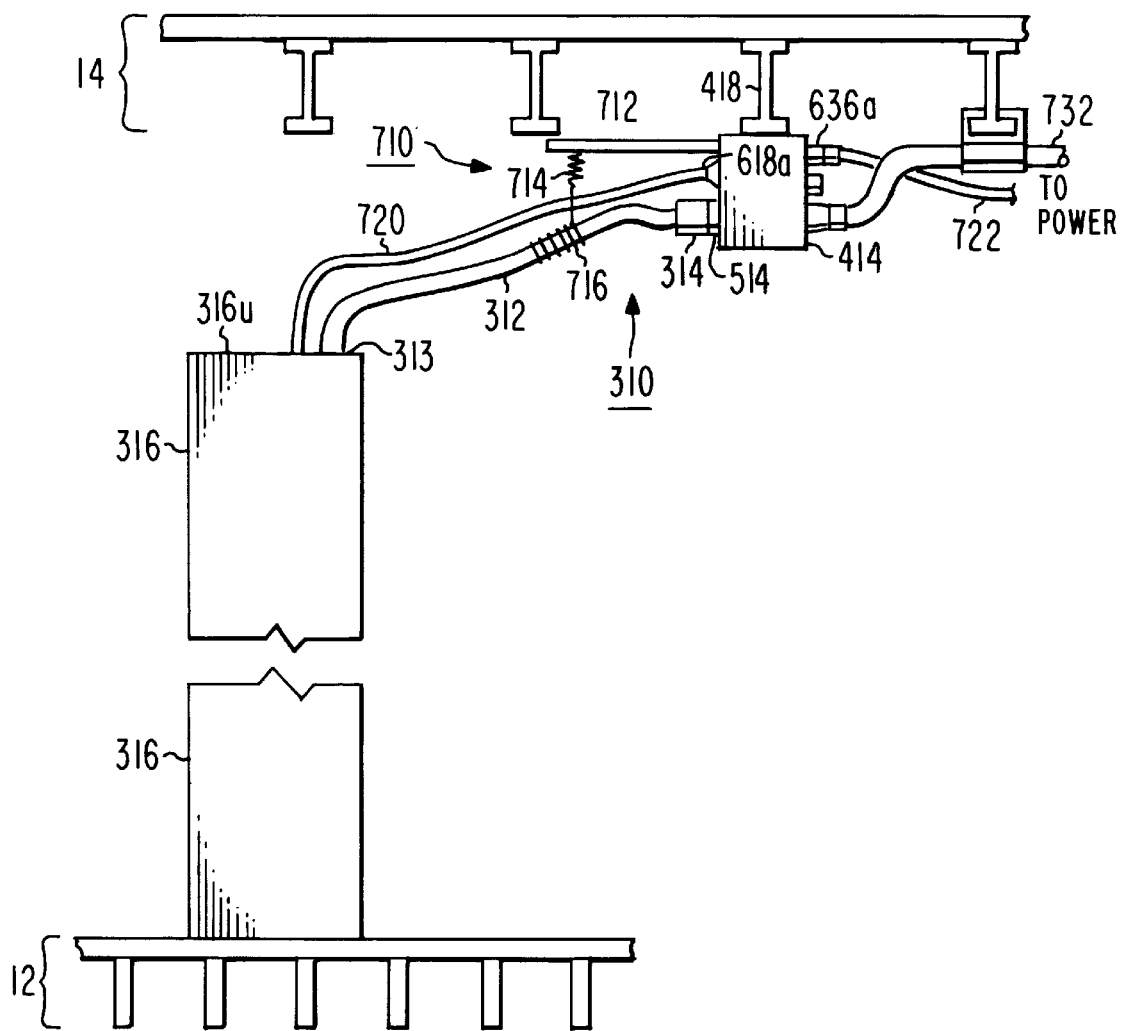
FIG. 7 is a simplified view of a tower as in FIG. 3 installed in the location of FIG. 4 using the interface box of FIGS. 5, 6a and 6b, resulting from installation in accordance with the described method.

FIG. 7 is a simplified representation of a tower installed in accordance with the method of the invention. In FIG. 7, the NEMA configuration male connector 314 is coupled to NEMA configuration female connector 514 so as to make electrical and mechanical connection. Conduit designated as 732 was installed contemporaneously with interface box 414, and (when the remotely located power switch or breaker is in the ON position) carries power through the conductor, pin or terminal sets 518, 520, and 522, and through corresponding pins of male connector 314 and the conductors within sheath 312 of flexible power cord 310 to the interior mechanisms and devices of tower structure 316.

As mentioned, the length of the flexible power cable 310 was selected to be longer than the distance from the origin of the power cable on the tower to the NEMA configuration female connector on the interface box, so that a strain-relief loop could be provided. In FIG. 7, the strain relief is provided by a support 712, illustrated as being associated with the housing of interface box 414. A spring 714, supported by support 712, is connected to a reinforcement or distributor 716 on the cable. In a particular embodiment, the distributor or reinforcement consists of a wire harness similar to a "Chinese finger trap" surrounding the flexible portion of sheath 312, with a wire attachment to the lower end of spring 714.

FIG. 7 also illustrates the command and control connections for the tower 316. In FIG. 7, a signal conductor path is designated 720, and it connects to the upper portion of tower structure 316 at a location near point 313. Path 720 may be a multiconductor signal cable, as known in the art. The end of signal cable 720 remote from the tower structure is fitted with an connector which mates with connector 618a of interface box 414, During the installation of interface box 414, a multiconductor signal cable 722 is coupled to the mail-handling and -sorting LAN, and thorough one of fittings 636a or 636b to the signal chamber 632. Connections are made within chamber 632 between the conductors of cable 722 and at least one of connectors 618a and 618b, so that the LAN is connected to that one (or both) of terminals 618a and 618b. Thus, at the time of the physical installation of tower 316, the two flexible cables are simply plugged into the preexisting, pretested interface box, and no further testing should be required prior to turn-on, thereby saving time. Of course, prudence suggests at least one retest before energization of the equipment to provide assurance that nothing has changed since the initial installation.

Other embodiments of the invention will be apparent to those skilled in the art. For example, types of conveyors other than roller conveyors may be used. While the term "box" has been applied to the interface apparatus 414, those skilled in the art know that the shape of the housing is irrelevant, and that any convenient shape may be used. The term "between" as applied to the connection of electrical conductors should not be interpreted in a physical sense, but rather indicates the elements which are electrically interconnected, regardless of the physical routing of the conductors. While the control system has been described as a LAN, any type of controller may be used, and the control conductors and connectors must be appropriate to the application. Some of the conductors inside sheath 312 of power cord 310 may not be connected to a pin of the connector 314, and one or more of the pins of the connector 314 may not be connected to a conductor of the sheath 312 so long as the connections which are required actually exist. In other words, it doesn't matter if irrelevant or unused wires are connected. While the support for the strain-relief loop has been illustrated in a particular embodiment, many forms of strain relief are available, and may be used instead of the illustrated arrangement.

Thus, a method according to the invention is for installing mail-handling towers (11) of various heights (H) at a mail-handling site. The method includes the step, prior to physical installation of any one of the towers (11) at its tower location (410) within the site, of selecting a location at which an interface box (414) can be installed. The selection of an installation location for the interface box involves determining a support location (412) which is no more than a particular radius (r) from a particular location (313) near the upper end (316u) of the particular one of the towers (316), having a particular height (H), to be installed at the tower location (410) within the site. The method further includes the step of procuring an interface box (414) including at least two power terminals or pins (518a and 518b, for example) associated with a NEMA configuration female connector (514) having a particular pin configuration (the circular configuration of FIG. 6a, for example), and also including at least two power terminals (520a and 520b, for example) exmaple, which are not in a NEMA configuration connector), and further having electrical interconnections (522a and 522b, for example) between at least two of the pins of the NEMA configuration female connector and corresponding ones of the non-NEMA terminals. At a time no later than the time of physical installation of the particular one of the towers (316) at the tower location (410) within the site, the interface box (414) is physically installed at the support location (412). At a time no later than the time of physical installation of the particular one of the towers (316) at the tower location (410) within the site, conventional electrical connections are made between a source of electrical power and the non-NEMA terminals (520a and 520b, for example) of the interface box (414). At a time no later than concurrently with completion of the physical installation of the particular one of the towers (316) at the tower location (410) within the site, the power available at the pins (518a, 518b, for example) of the NEMA configuration female connector (514) of the interface box (414) is tested to verify conformance with a standard. The method further includes the step of installing, at the tower location (410), one of the towers (316) having the particular height (H). The tower (316) so installed includes a power cord (310) terminated at (or in) a NEMA configuration male connector (314) and having a pin configuration mating with that of the NEMA configuration female connector (514). The power cord (310) is affixed to the particular location (313) near the upper end (316u) of the one of the towers (316). The power cord is of a length such that it has a free end (320) capable of being extended from the particular location (313) near the upper end (316u) of the one of the towers (316) by an amount (R) which is greater than the radius (r). The final step of the method is that of making a connection between the NEMA configuration male (314) and female (514) connectors.

In one mode of the method, the step of making a connection between the NEMA male and female connectors includes the step of introducing a strain-relief loop into the power cord.

In general, the invention allows the installation of the electrical power connections to a junction or interface box (414) located near the known or projected location (313) of the upper end (316u) of a tower (11). Since the location (410) and height (H) of the tower (11) are known before installation of the tower, the location of the upper end of the tower structure is also known.

The manufacturer of the tower provides a flexible electrical power cord (310) with a NEMA or other connector (314), both of which are rated for the power level and use. The flexible electrical power cord (310), as supplied by the manufacturer, is electrically connected, at the end remote from the NEMA (or other) connector, to the power system of the tower. The flexible power cord (310) is physically connected (at a point 313) to the tower (316) near the upper end (316u) thereof, with a free length (measured between point 313 and the end 320). The free length is terminated in the NEMA (or other suitable) connector (314). Thus, the flexible power cord (310) is the equivalent of a "line cord" affixed to the upper end (316u) of the tower (316). The NEMA connector (320) on the flexible cord (310) can be simply plugged into a mating NEMA connector (514) on a previously installed interface box (414). This method of installation allows the main portion of the electrical work to be done before the arrival of the towers on-site, and allows a small crew working over a substantial length of time to provide the electrical infrastructure for the installation. The prior method of installation required the electrical installation to be performed after the delivery of the towers and their physical installation at the site. Thus, in the prior art method of installation, the electrical work must be both started and completed after the physical installation of the towers at the site. A substantial saving in time between physical installation and the time the equipment can begin operation is thus available by use of the method according to the invention. Also, since only one electrical crew is needed, there is no requirement to hire large numbers of crews to complete the installation in a timely manner, and the risk of installation error due to employment of a less-experienced crew is reduced. Further, installation according to the invention results in a site which can be physically moved at the installed location without reinstallation by an electrical crew, by merely adding an extension power cord.

What is claimed is:

1. A method for installing mail-handling towers of various heights at a mail-handling site, said method comprising the steps of:

prior to physical installation of any one of said towers at its intended tower location within said site, selecting a location at which an interface box can be installed, including the step of determining a support location which is within a particular radius from a particular location near the upper end of the particular one of said towers, having a particular height, to be installed at said tower location within said site;

procuring an interface box including at least two power terminals associated with a NEMA configuration female connector having a particular pin configuration, and also including at least two power terminals which are not in a NEMA configuration connector, and further having electrical interconnections between at least two of said NEMA pins and corresponding ones of said non-NEMA terminals;

no later than the time of physical installation of said particular one of said towers at said tower location within said site, physically installing said interface box at said support location;

no later than the time of physical installation of said particular one of said towers at said tower location within said site, making conventional electrical connections between a source of electrical power and said non-NEMA power terminals of said interface box;

no later than concurrently with completion of said physical installation of said particular one of said towers at said tower location within said site, testing the power available at said pins of said NEMA configuration female connector to verify conformance with a standard;

installing at said tower location one of said towers having said particular height, and also having a flexible power cord terminated at a NEMA configuration male connector and having a pin configuration mating with that of said NEMA configuration female connector, which power cord is affixed to said particular location near the upper end of said one of said towers, said power cord having a free end capable of being extended from said particular location near said upper end of said one of said towers by an amount which is greater than said radius; and making a connection between said NEMA configuration male and female connectors.

2. A method according to claim 1, wherein said step of making a connection between said NEMA male and female connectors includes the step of introducing a strain-relief loop into said power cord.

\* \* \* \* \*